United States Patent [19]

Mizuno et al.

[11] Patent Number: 4,746,224

[45] Date of Patent: May 24, 1988

[54] SCANNING TYPE, RADIANT-ENERGY RESPONSIVE TEMPERATURE MEASURING APPARATUS

[75] Inventors: Masashi Mizuno; Mitsuo Utsuno, both of Aichi, Japan

[73] Assignee: Daido Tokushuko Kabushiki Kaisha, Nagoya, Japan

[21] Appl. No.: 943,489

[22] Filed: Dec. 19, 1986

[30] Foreign Application Priority Data

Dec. 19, 1985 [JP] Japan ............................ 60-286169

[51] Int. Cl.$^4$ ...................... G01K 13/06; G01K 1/16; G01J 5/00
[52] U.S. Cl. ................................. 374/124; 374/128; 250/359.1; 356/43
[58] Field of Search ............... 374/120, 121, 124, 128, 374/129, 137, 153, 166, 167; 250/359.1, 349, 346, 394; 356/43; 340/584, 600

[56] References Cited

U.S. PATENT DOCUMENTS

| | | | |
|---|---|---|---|
| 3,044,297 | 7/1962 | Hanken | 374/128 |
| 3,688,295 | 8/1972 | Tsoras et al. | 374/166 |
| 3,861,458 | 1/1975 | Ostrander et al. | 250/349 |
| 4,439,049 | 3/1984 | Hoogendoorn et al. | 374/124 |
| 4,559,819 | 12/1985 | Deppe et al. | 374/137 |

Primary Examiner—William A. Cuchlinski, Jr.
Assistant Examiner—Patrick R. Scanlon
Attorney, Agent, or Firm—Oblon, Fisher, Spivak, McClelland & Maier

[57] ABSTRACT

A radiant-energy temperature measuring apparatus of a scanning type having a linear array of light-sensitive elements which generate photoelectric signals corresponding to respective amounts of radiant energy produced at different points of an object and vicinities thereof on a straight line corresponding to the above linear array, and further having a device for determining a temperature of the object at desired one of its different points, based on the photoelectric signal generated by one of the light-sensitive elements which optically matches the desired one point of the object. The apparatus includes an edge detector for detecting an edge of the object, based on the photoelectric signals generated by the light-sensitive elements, and a selector for selecting the desired one point of the object, by designating a number of the light-sensitive elements as counted from the element corresponding to the detected edge of the object, to the element which corresponds to the above-indicated desired one point. The selector applies to the temperature determining device the photoelectric signal from the light-sensitive element corresponding to the selected point.

4 Claims, 3 Drawing Sheets

SCANNING TYPE, RADIANT-ENERGY RESPONSIVE TEMPERATURE MEASURING APPARATUS

BACKGROUND OF THE INVENTION

1. Field of the Invention

The present invention relates in general to a radiation thermometer adapted to measure a temperature based on a radiant energy produced by an object, and more particularly to a radiant-energy responsive temperature measuring apparatus of a scanning type wherein a plurality of light-sensitive elements responsive to the radiant energy from the object are disposed in a straight line.

2. Discussion of the Prior Art

As a radiation thermometer responsive to radiant energy produced by an object to be observed, there is known a radiant-energy temperature measuring apparatus of a scanning type indicated above. Generally, this type of radiant-energy responsive temperature measuring apparatus incorporates a light-sensitive device which has a linear array of plurality of light-sensitive elements which are responsive to respective amounts of radiant energy produced at different points of the object arranged on a straight line, and which generate photoelectric signals whose levels correspond to the respective amounts of radiant energy received. The measuring apparatus further incorporates a device for determining temperatures of the object, according to the photoelectric signals generated from the light-sensitive elements of the light-sensitive device.

In this scanning type of radiant-energy temperature measuring apparatus, the temperature of the object at the desired one of the different points on a straight line can be measured by supplying the temperature determining device with the photoelectric signal from the corresponding one of the light-sensitive elements which optically matches the desired point on the object. For example, where the object is a steel material which is fed in a predetermined direction for a hot-rolling process, the measuring apparatus is capable of continuously measuring the temperature of the material at a desired point thereof that is selected in a direction of width of the material perpendicular to its feeding direction.

Thus, once the point of measurement of the temperature has been determined, the corresponding light-sensitive element whose photoelectric signal is applied to the temperature determining device is determined and fixed. Therefore, if the relative position between the scanning type radiant-energy temperature measuring apparatus and the object is changed, or deviated from the predetermined relation, the apparatus fails to accurately measure the temperature of the object at the selected point. In the above case wherein the object is moved in one direction while the measurement point is selected in the direction perpendicular to the moving direction, as described above, the position of the moving object tends to be varied in the above perpendicular direction, due to possible vibration of the object, whereby the actual point of measurement may be deviated from the predetermined desired point.

SUMMARY OF THE INVENTION

It is accordingly an object of the present invention to provide a radiant-energy temperature measuring apparatus of a scanning type which is substantially free from such a deviation of the actual point of measurement of temperature on an object, from the desired point of measurement, even if the apparatus and the object are displaced relative to each other in a direction in which the point of measurement is selected.

The above object may be achieved according to the principle of the present invention, which provides a radiant-energy temperature measuring apparatus of a scanning type having a linear array of light-sensitive elements which generate photoelectric signals corresponding to respective amounts of radiant energy produced at different points of an object and vicinities thereof on a straight line corresponding to the linear array, and further having a means for determining a temperature of the object at desired one of its different points, based on the photoelectric signal generated by one of the light-sensitive elements which optically matches the desired one point of the object, the apparatus comprising: (a) edge detecting means for detecting an edge of the object, based on the photoelectric signals generated by the light-sensitive elements; and (b) selector means for selecting the desired one point of the object, by designating a number of the light-sensitive elements as counted from the element corresponding to the detected edge of the object, to the element which corresponds to the above-indicated desired one point. Based on this number of the light-sensitive elements, the selector means supplies the temperature determining means with the photoelectric signal generated by the above-indicated one light-sensitive element corresponding to the selected point.

In the radiant-energy temperature measuring apparatus of a scanning type of the present invention constructed as described above, the photoelectric signals generated by the plurality of light-sensitive elements are first applied to the edge detecting means and the selector means. The edge detecting means determines the light-sensitive element corresponding to the edge of the object, based on the photoelectric signals received from the light-sensitive elements. The selector means determines the light-sensitive element corresponding to the desired one of the different points of measurement on the object, based on the predetermined number of the elements as counted from the element corresponding to the detected edge, to the element corresponding to the desired point. The selector means is adapted to supply the temperature determining means with the photoelectric signal generated by the determined light-sensitive element corresponding to the desired point of measurement. Based on the photoelectric signal from this element, the determining means determines the temperature of the object at the desired or selected point of measurement.

It is noted that the designated number of the light-sensitive elements counted by the selector means corresponds to a distance between the detected edge of the object and the desired point of measurement on the object. In other words, the desired point of measurement as defined by a distance from the detected edge of the object can be designated by setting the number of the light-sensitive elements as counted from the object edge to the point of measurement.

As described above, the present temperature measuring apparatus is adapted to set the desired point of measurement of temperature with respect to an edge of the object. Hence, even if the relative position between the object and the apparatus is changed, the actual point of measurement will not be deviated from the predetermined point of measurement, since the distance between the edge of the object to the predetermined point and the corresponding number of the light-sensitive elements will not be changed. Consequently, the present radiant-energy temperature measuring apparatus is capable of measuring the temperature of the object at a desired point thereof, with sufficiently high accuracy.

The scanning type radiant-energy temperature measuring apparatus of the present invention is suitably used for measuring temperatures of a heated steel material that is to be hot-rolled.

According to one advantageous feature of the present invention, the apparatus further comprises a drive control circuit which generates pulse signals to be applied to the light-sensitive device at a predetermined interval, the plurality of light-sensitive elements being successively activated upon successive reception of the pulse signals, beginning with one of the elements at one of opposite ends of the linear array, thereby generating the respective photoelectric signals one after another, and the detector means comprises an edge-level setter for producing a reference signal whose level is slightly lower than a level corresponding to an amount of radiant energy that should be produced at the edge of the object, and a comparator for comparing a level of each of the respective photoelectric signals from the light-sensitive device, with a level of the reference signal. The comparator generates an edge signal indicative of the edge of the object, when the level of the successively received photoelectric signals from the light-sensitive device exceeds the level of the reference signal.

In one form of the above feature of the invention the selector means comprises a measuring-point setter which generates a measuring-point signal indicative of the number of the light-sensitive elements, a counter for counting a number of the pulse signals which have been generated from the drive control circuit after the edge signal is generated from the comparator. The counter generates a carry signal when the number of the pulse signals reaches the number of the light-sensitive elements represented by the measuring-point signal. The selector means further comprises an A/D converter responsive to the carry signal to convert the photoelectric signal generated from the above-indicated one light-sensitive element into a digital signal, and apply the digital signal to the temperature determining means.

BRIEF DESCRIPTION OF THE DRAWINGS

The above and other objects, features and advantages of the present invention will be better understood by reading the following detailed description of a preferred embodiment of this invention, when considered in connection with the accompanying drawings, in which.

DETAILED DESCRIPTION OF THE PREFERRED EMBODIMENT

Figure 1:
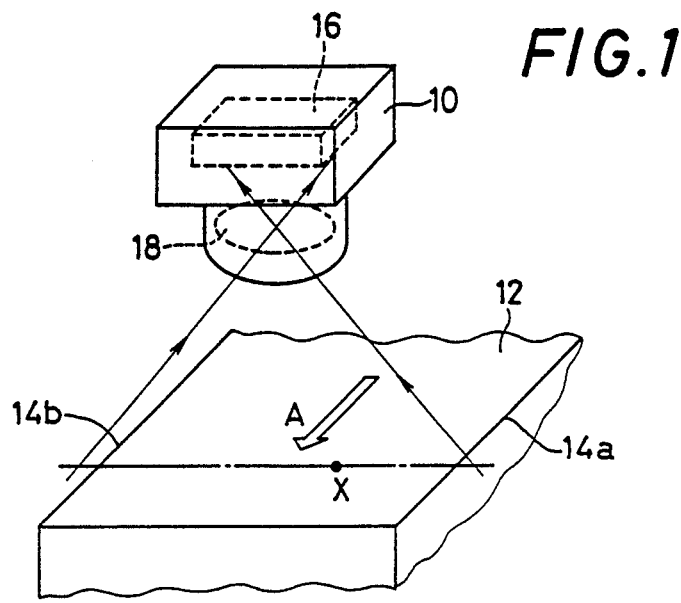
FIG. 1 is a perspective view showing a light-sensitive device of one embodiment of a scanning type radiant-energy temperature measuring apparatus of the present invention, positioned above an object in the form of a steel material being moved for hot rolling.
Figure 2:
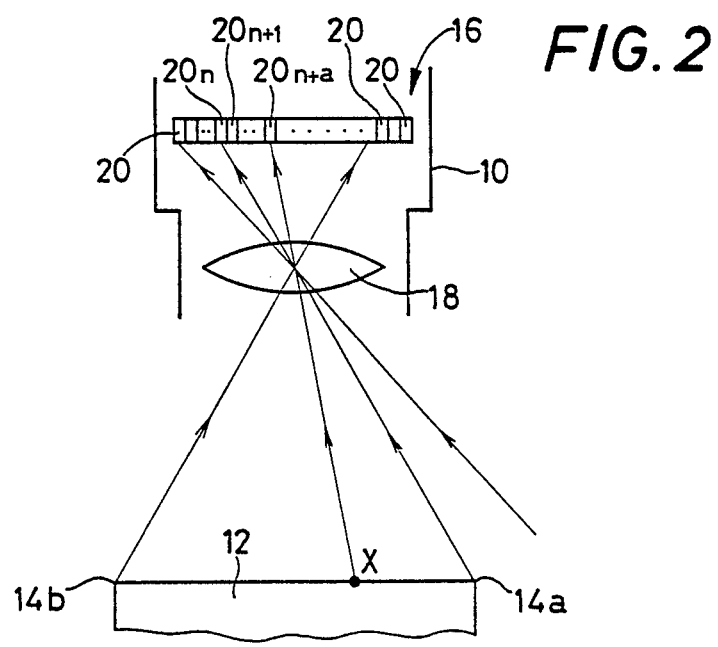
FIG. 2 is an illustration explaining an arrangement of the light-sensitive device of FIG. 1.

Referring first to FIGS. 1 and 2, reference numeral 10 designates a light-sensitive device which is responsive to radiant energy produced by an object in the form of a steel material 12. The light-sensitive device 10 includes a line sensor 16 disposed in a direction perpendicular to opposite edges 14a, 14b of the steel material 12, and lens 18 for focusing a beam of the radiant energy on the line sensor 16. The line sensor 16 consists of a plurality of light-sensitive elements in the form of a multiplicity of photoelectric elements 20 (e.g., several thousands) which are responsive to respective amounts of radiant energy produced at different points on the steel material 12 and its vicinities, which are arranged on a straight line (indicated in one-dot chain line in FIG. 1) perpendicular to the edges 14a, 14b. The photoelectric elements 20 are adapted to generate photoelectric signals SS whose levels correspond to the specific amounts of radiant energy received from the respective points of measurements on the object 12 arranged on the straight line indicated in the one-dot chain line in FIG. 1. Thus, the photoelectric elements 20 optically match or correspond to the multiplicity of points of measurements on the steel material 12. The steel material 12 is preheated by a heating apparatus (not shown), and continuously fed toward a hot-rolling station (not shown) in a direction A indicated in FIG. 1, parallel to the edges 14a, 14b.

Figure 3:
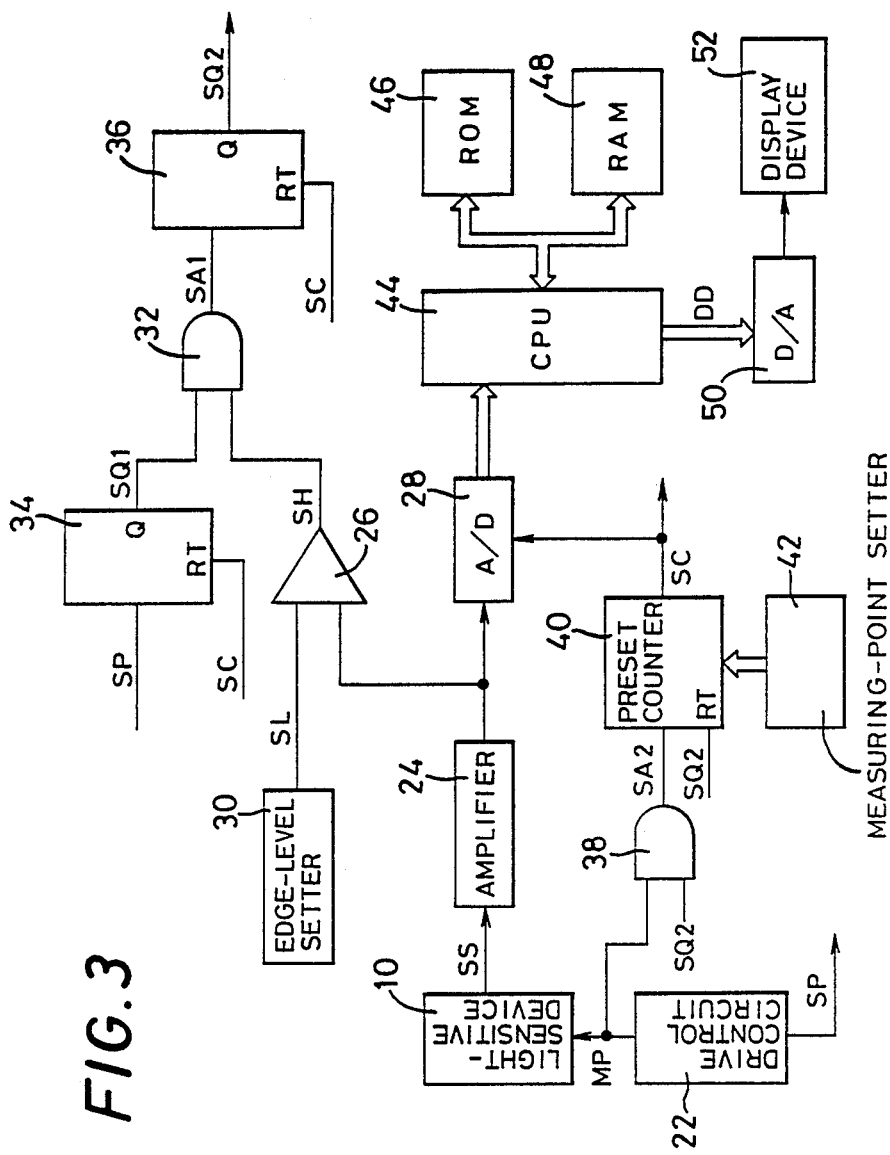
FIG. 3 is a schematic block diagram of a control system of the temperature measuring device of FIG. 1.
Figure 4:
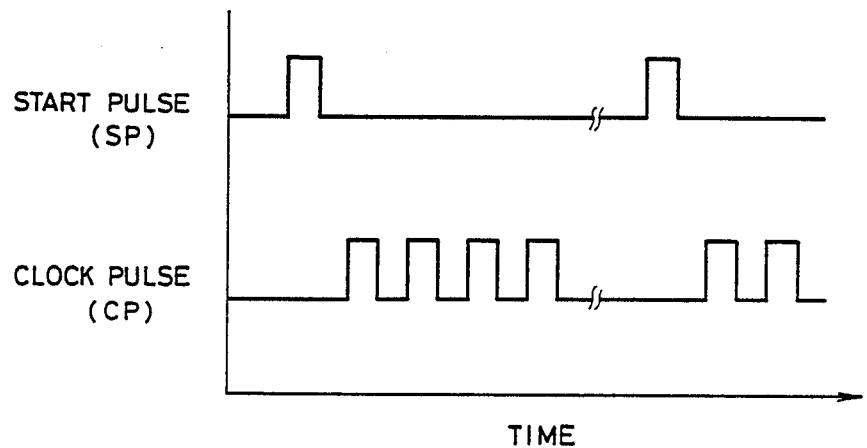
FIG. 4 is a timing chart indicating start and clock pulses generated by a drive control circuit of the control system of FIG. 3.

The light-sensitive device 10 is electrically connected to a control system shown in the block diagram of FIG. 3, wherein the photoelectric signals SS generated one after another by the individual photoelectric elements 20 of the line sensor 16 are successively applied to an amplifier 22, in timed relation with pulse signals MP which are generated from a drive control circuit 22 and which are applied to the light-sensitive device 10. More specifically, the pulse signals MP consist of a START pulse SP and a CLOCK pulse CP, which are produced as shown in FIG. 4. After the light-sensitive device 10 receives each START pulse SP from the drive control circuit 22, the line sensor 16 applies the photoelectric signals SS in sequence to the amplifier 24 upon reception of each CLOCK pulse CP, beginning with the photoelectric signal SS generated by the leftmost photoelectric element 20 as viewed in FIG. 2.

The photoelectric signals SS received by the amplifier 24 are then fed to a comparator 26 and an A/D converter 28. The comparator 26 compares the level of each received photoelectric signal SS with the level of a reference signal SL received from an edge-level setter 30. When the level of the photoelectric signal SS is higher than that of the reference signal SL, the comparator 26 applies to an AND gate 32 an EDGE signal SH indicative of an edge of the steel material 12. The levels of the photoelectric signals SS correspond to amounts of radiant energy produced at respective different points on the surface of the steel material 12, and these amounts of radiant energy are greater than those produced by articles other than the steel material 12. That is, the levels of the photoelectric signals SS generated by the photoelectric elements 20 corresponding to the edges 14a, 14b and the areas near and inside the edges 14a, 14b of the steel material 12 are considerably higher than the levels of the signals SS generated by the elements 20 which are located outwardly of the elements 20 (e.g., 20n) corresponding to the edges 14a, 14b and their neighboring areas of the steel material 12. Therefore, if the level of the reference signal SL generated by the edge-level setter 30 is set to a value slightly smaller than those of the photoelectric signals SS generated by the photoelectric elements 20 which receive the radiant energy from the edge portion of the steel material 12, the edge 14a and the corresponding photoelectric element 20, for example, can be detected by the comparator 26 by sensing an increase in the level of the photoelectric signals SS with respect to that of the reference signal SL, during monitoring of the levels of the successively supplied signals SS from the elements 20, beginning with the element 20 located at the leftmost position as viewed in FIG. 2. When the comparator 26 detects that the level of the photoelectric signal SS exceeds the level of the reference signal SL from the edge-level setter 30, the above-indicated EDGE signal SH is produced, whereby the edge 14a is detected. Described more particularly referring to FIG. 2, this EDGE signal SH is produced when the level of the photoelectric signal SS generated by the photoelectric element 20(n) which optically matches the edge 14a of the object 12, is received by the comparator 26 and compared with the reference signal SL. In the present embodiment, the comparator 26 and the edge-level setter 30 constitute detecting means for detecting the edge 14a of the object 12.

The AND gate 32 which receives the EDGE signal SH from the comparator 26 is adapted to also receive an output signal SQ1 produced by a first flip-flop circuit 34. The flip-flop circuit 34 is adapted to produce the output signal SQ1 each time the START pulse SP is received from the drive control circuit 22. At the time when the AND gate 32 receives the EDGE signal SH from the comparator 26, the output signal SQ1 has already been present at the input of the AND gate 32. Consequently, the AND gate 32 produces its output signal SA1 as soon as the EDGE signal SH has been received. The output signal SA1 is applied to a second flip-flop circuit 36.

Upon reception of the output signal SA1 from the AND gate 32, the second flip-flop circuit 36 generates its output signal SQ2, which is applied to an AND gate 38 and to a present counter 40. The AND gate 38 is adapted to also receive the pulse signals MP from the drive control circuit 22. After the output signal SQ2 is applied to the AND gate 38, this gate 38 applies its output signal SA2 to the preset counter 40 each time the CLOCK pulse CP is received from the circuit 22. When the output signal SQ2 is applied to a RESET terminal RT of the present counter 40, that is, when the edge 14a of the steel material 12 is detected, the preset counter 40 reads a value "a" represented by a measuring-point signal from a MEASURING-POINT setter 42, and the content of the counter 40 is initialized to that value "a". The thus initialized content of the present counter 40 is decremented each time the output signal SA2 of the AND gate 38 is applied to the counter 40. When the content of the preset counter 40 is zeroed, the counter 40 produces a CARRY signal SC, which is applied to the A/D converter 28, and the first and second flip-flop circuits 34, 36. With the CARRY signal SC applied to the A/D converter 28, the photoelectric signal SS converted into a digital signal by the A/D converter 28 is fed to a central processing unit (CPU) 44. In the meantime, the CARRY signal SC applied to the flip-flop circuits 34, 36 inhibits these circuits from generating their output signals SQ1, SQ2.

Described in more detail, after the photoelectric signal SS has been generated by the photoelectric element 20(n) corresponding to the edge 14a of the object 12, the light-sensitive device 10 sequentially or successively generates the photoelectric signals SS of the following photoelectric elements 20(n+1), 20(n+2), ..., in timed relation with the CLOCK pulses CP generated by the drive control circuit 22. During the sequential generation of these photoelectric signals SS, the content of the preset counter 40 is decremented until the content is zeroed, that is, until the photoelectric signal SS of the photoelectric element 20(n+a) is applied to the A/D converter 28. The value "a" represented by the measuring-point signal from the MEASURING-POINT setter 42 represents the number of the photoelectric elements 20 as counted from the element 20(n) to the element 20(n+a) which optically matches the desired point of measurement of temperature on the steel material 12. In other words, the value "a" preset on the setter 42 represents a distance between the edge 14a of the steel material 12, and the desired measuring point X (FIGS. 1 and 2) on the straight line on the material 12, which straight line corresponds to the linear array of the photoelectric elements 20. Thus, the photoelectric signal SS indicative of the amount of radiant energy produced at the point X on the steel material 12 is supplied to the CPU 44 through the A/D converter 28. In the present embodiment, the AND gate 38, the preset counter 40, the MEASURING-POINT setter 42 and the A/D converter 28 constitute selector means for selecting the desired point X of measurement on the steel material 12, which point X corresponds to one of the photoelectric elements 20(n+a) which is designated by the value "a" preset on the MEASURING-POINT setter 42. While the value "a" represented by the measuring-point signal from the setter 42 represents the number of the photoelectric elements 20 as counted from the element 20(n) to the element 20(n+a), it is possible to preset the setter 42 by entering data indicative of a distance between the edge 14a of the steel material 12 and the desired measuring point X.

The CPU 44 is connected through a data bus line to a read-only memory (ROM) 46 and a random-access memory (RAM) 48. The CPU 44, ROM 46 and RAM 48 cooperate to constitute temperature determining means in the form of a microcomputer which is adapted to process the received photoelectric signal SS, according to a program stored in the ROM 46, and while utilizing a temporary storage function of the RAM 48. For example, the CPU 44 determines a temperature at the designated point X, according to a data map in the ROM 46, which represents a relationship between the level of the photoelectric signal SS and the corresponding temperature. The CPU 44 generates a TEMP signal DD representative of a temperature, which TEMP signal DD is applied to a D/A converter 50. The TEMP signal DD received by the D/A converter 50 is converted into an analog signal, which is applied to a suitable display device 52. The temperature represented by the analog signal from the D/A converter 50 is indicated on a cathode ray tube of the display device 52, and recorded on a chart by a suitable device also incorporated in the display device 52.

After the drive control circuit 22 has produced the CLOCK pulses CP corresponding in number to the photoelectric elements 20, the circuit 22 produces again the START pulse SP and subsequently the same number of the CLOCK pulses CP. As a result, the series of operations described above are repeated, whereby the CPU 44 determines the temperature of the moving steel material 12, at a point thereof which is away from the previously measured point X in the direction opposite to the feeding direction A parallel to the edges 14a, 14b. This newly measured point is also spaced away from the edge 14a by a distance corresponding to the number of the photoelectric elements 20 designated by the value "a" represented by the measuring-point signal generated by the setter 42.

As described above, the instant scanning type radiant-energy temperature measuring apparatus is operated to first detect the photoelectric element 20(n) corresponding to the edge 14a of the steel material 12, and then determines a temperature of the steel material 12 at the desired measuring point, based on the photoelectric signal SS generated by the photoelectric element 20(n+a) which is designated by the value "a" representing the number of the photoelectric elements 20 as counted from the edge 14a. In this arrangement wherein the measuring point X is determined by a distance from the edge 14a which corresponds to the value "a", the actual point of measurement will not be deviated from the predetermined point X, even if the position of the steel material 12 is changed in the direction perpendicular to the feeding direction A during the feeding movement in the direction A. Hence, the instant apparatus permits consistently high accuracy of measurement of temperature at the desired point in the direction of width of the steel material 12.

While the present invention has been described in detail in its preferred embodiment, various changes and modifications may be made in the invention.

For example, while the illustrated embodiment is adapted to measure a temperature at a single point on the object, it is possible to measure temperatures at two or more different points on the object. In this case, two or more preset counters similar to the counter 40 are required.

In the illustrated embodiment, the edge detecting means and the selector means are constituted by hard-logic circuits such as the comparator 26 and the preset counter 40, these detecting and selector means may be constituted by a microcomputer which functions as the temperature determining means (44, 46, 48). Further, the temperature determining means may be constituted by a hard-logic circuit such as a linearization circuit.

Although the illustrated embodiment is adapted to measure a temperature at a single point X designated by a preset value "a" set on the MEASURING-POINT setter 42, the illustrated apparatus may be modified to measure temperatures at different points on the straight line indicated in the one-dot chain line in FIG. 1, and display and/or print a distribution of the measured temperatures. In this case, a mode selector switch is provided for placing the apparatus in a mode for obtaining the temperature distribution indicated above.

In the illustrated embodiment, the object in the form of the steel material 12 is moved in the direction A, it is possible to move the measuring apparatus relative to a fixed object, or hold the measuring apparatus and the object stationary to detect a change of the temperature at a fixed point on the object, depending upon the kind of the object to be observed, and the purpose of measuring the temperatures of the object.

While the illustrated embodiment is adapted to detect the edge 14a of the object by determining whether the leverl of photoelectric signal SS is higher than that of the reference signal SL, the edge 14a may be detected by detecting a rate at which the level of the photoelectric signal SS is changed.

Although the light-sensitive elements in the form of the photoelectric elements 20 of the line sensor 16 are disposed in a straight line perpendicular to the edge 14a of the steel material 12 in the illustrated embodiment, the linear array of the light-sensitive elements may be inclined at a suitable angle relative to the edge 14a. That is, the principle of the invention may be practiced provided the linear array of the light-sensitive elements intersects the edge 14a. In this case, the value "a" which determines the measuring point X is modified depending upon the angle of inclination of the linear array relative to the edge 14a. The above inclination is also possible even in the case where the radiant energy produced by the steel material 12 is reflected by a mirror or other suitable element before the radiation is directed to the line sensor 16.

While the illustrated embodiment uses the analog display device 52 for indicating and recording the measured temperature, it is possible to use a digital display device responsive to a digital signal from the CPU 44.

It will be understood that various other changes, modifications and improvements may be made in the invention, in the light of the foregoing teachings, without departing from the spirit and scope of the invention defined in the following claims.

What is claimed is:

1. A radiant-energy temperature measuring apparatus of a scanning type for measuring temperatures of an object, having a light-sensitive device including a linear array of a plurality of light-sensitive elements which are responsive to respective amounts of radiant energy produced at different points of said object and at different points of areas adjacent to and outside edges of said object arranged on a straight line corresponding to said linear array, said light-sensitive elements generating photoelectric signals corresponding to said respective amounts of radiant energy received from points of said object or from points of said areas adjacent to and outside the edges of said object, the apparatus further having means for determining a temperature of said object at a desired one of said different points thereof, based on the photoelectric signal generated by one of said plurality of light-sensitive elements which optically matches said desired one point of the object, said radiant-energy temperature measuring apparatus comprising:

edge detecting means for detecting an edge of said object in correspondence to one of said elements, based on said photoelectric signals generated by said plurality of light-sensitive elements; and selector means for selecting said desired one of the different points of the object, by designating a number of the light-sensitive elements as counted from said one element corresponding to said detected edge of the object, to said one light-sensitive element which optically matches said desired one point, said selector means applying said photoelectric signal generated by said one light-sensitive element, to said temperature determining means.

2. A radiant-energy temperature measuring apparatus according to claim 1, wherein said object comprises a heated steel material to be hot-rolled.

3. A radiant-energy temperature measuring apparatus according to claim 2, further comprising a drive control circuit which generates pulse signals to be applied to said light-sensitive device at a predetermined interval, said plurality of light-sensitive elements being successively activated upon successive reception of said pulse signals, beginning with one of said elements at one of opposite ends of said linear array, thereby generating the respective photoelectric signals one after another, and wherein said edge detecting means comprises an edge-level setter for producing a reference signal whose level is slightly lower than a level corresponding to an amount of radiant energy to be produced at the edge of said object, and a comparator for comparing a level of each of said respective photoelectric signals from said light-sensitive device, with the level of said reference signal, said comparator generating an edge signal indicative of said edge of the object, when the level of the successively received photoelectric signals from the light-sensitive device exceeds the level of said reference signal.

4. A radiant-energy temperature measuring apparatus according to claim 3, wherein said selector means comprises a measuring-point setter which generates a measuring-point signal indicative of said number of the light-sensitive elements, and a counter for counting a number of said pulse signals which have been generated from said drive control circuit after said edge signal is generated from said comparator, said counter generating a carry signal when said number of the pulse signals reaches said number of the light-sensitive elements represented by said measuring-point signal, said selector means further comprising an A/D converter responsive to said carry signal to convert the photoelectric signal generated from said one light-sensitive element into a digital signal, and apply said digital signal to said temperature determining means.

* * * * *